United States Patent
Araújo et al.

(10) Patent No.: US 11,995,369 B2
(45) Date of Patent: May 28, 2024

(54) CONTROLLING DISPLAY OF CONTENT USING AN EXTERNAL DISPLAY DEVICE

(71) Applicant: Telefonaktiebolaget LM Ericsson (publ), Stockholm (SE)

(72) Inventors: José Araújo, Stockholm (SE); Lars Andersson, Solna (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 17/735,703

(22) Filed: May 3, 2022

(65) Prior Publication Data

US 2022/0261202 A1    Aug. 18, 2022

Related U.S. Application Data

(63) Continuation of application No. 17/087,772, filed on Nov. 3, 2020, now Pat. No. 11,354,082, which is a
(Continued)

(51) Int. Cl.
*G06F 3/14* (2006.01)
*G02B 27/01* (2006.01)
(Continued)

(52) U.S. Cl.
CPC ....... *G06F 3/1423* (2013.01); *G02B 27/0172* (2013.01); *G06F 1/163* (2013.01);
(Continued)

(58) Field of Classification Search
CPC ...... G06F 3/1423; G06F 1/163; G06F 1/1647; G06F 1/3212; G06F 1/3265;
(Continued)

(56) References Cited

U.S. PATENT DOCUMENTS 10,001,645 B2    6/2018    Norden
10,503,459 B2    12/2019   Lim et al.
(Continued)

FOREIGN PATENT DOCUMENTS

EP    2387202 A1    11/2011
EP    2824537 A1    1/2015

OTHER PUBLICATIONS

Communication pursuant to Article 94(3) EPC for European Patent Application No. 16791562.8 dated Feb. 25, 2020, 6 pages.
(Continued)

*Primary Examiner* — Mihir K Rayan
(74) *Attorney, Agent, or Firm* — Sage Patent Group

(57) ABSTRACT

It is presented a method for controlling display of content, the method being performed in a wearable device, the wearable device comprising a head mounted display allowing a user to see both real-world objects and computer-rendered content. The method comprises the steps of: selecting an external display device in a vicinity of the wearable device; determining first visual content to be suitable for being displayed on the external display device; and sending a request for the external display device to display the first visual content and refraining from displaying the first visual content using the head mounted display.

20 Claims, 4 Drawing Sheets

Related U.S. Application Data continuation of application No. 16/344,879, filed as application No. PCT/EP2016/076425 on Nov. 2, 2016, now Pat. No. 10,877,713.

(51) Int. Cl.
*G06F 1/16* (2006.01)
*G06F 1/3212* (2019.01)
*G06F 1/3234* (2019.01)
*G09G 5/12* (2006.01)
*H04L 67/148* (2022.01)

(52) U.S. Cl.
CPC .......... *G06F 1/1647* (2013.01); *G06F 1/3212* (2013.01); *G06F 1/3265* (2013.01); *G09G 5/12* (2013.01); *G02B 2027/014* (2013.01); *G02B 2027/0178* (2013.01); *G09G 2330/021* (2013.01); *H04L 67/148* (2013.01)

(58) Field of Classification Search
CPC .......... G02B 27/0172; G02B 2027/014; G02B 2027/0178; G02B 27/017; G02B 27/0103; G09G 5/12; G09G 2330/021; H04L 67/148; H04L 67/51
See application file for complete search history.

(56) References Cited

U.S. PATENT DOCUMENTS

| | | | | |
|---|---|---|---|---|
| 10,877,713 B2* | 12/2020 | Araújo | .................... | H04L 67/51 |
| 11,354,082 B2* | 6/2022 | Araújo | .................... | G09G 5/12 |
| 2002/0154214 A1 | 10/2002 | Scallie et al. | | |
| 2011/0012993 A1* | 1/2011 | Kuno | .................... | H04N 13/398 |
| | | | | 348/E13.001 |
| 2011/0310222 A1 | 12/2011 | Kim et al. | | |
| 2012/0127284 A1 | 5/2012 | Bar-Zeev et al. | | |
| 2013/0147686 A1* | 6/2013 | Clavin | ................. | G02B 27/017 |
| | | | | 345/8 |
| 2013/0167040 A1 | 6/2013 | Lee et al. | | |
| 2013/0187835 A1 | 7/2013 | Vaught et al. | | |
| 2013/0336631 A1 | 12/2013 | Kura | | |
| 2014/0035851 A1 | 2/2014 | Kim et al. | | |
| 2014/0189395 A1* | 7/2014 | KP | ........................ | G06F 1/3218 |
| | | | | 713/320 |
| 2014/0191926 A1* | 7/2014 | Mathew | ................ | G06F 1/3287 |
| | | | | 345/1.1 |
| 2014/0368539 A1 | 12/2014 | Yeh | | |
| 2015/0100802 A1* | 4/2015 | Thomas | ................ | G06F 1/3265 |
| | | | | 713/320 |
| 2015/0187326 A1 | 7/2015 | Doyen et al. | | |
| 2015/0341704 A1* | 11/2015 | Choi | .................... | H04N 21/816 |
| | | | | 725/81 |
| 2016/0103650 A1 | 4/2016 | Lim et al. | | |
| 2016/0210097 A1 | 7/2016 | Forutanpour et al. | | |

OTHER PUBLICATIONS

International Search Report and Written Opinion of the International Searching Authority, PCT/EP2016/076425, dated Jun. 8, 2017, 10 pages.
Robert Likamwa et al., Draining Our Glass: An Energy and Heat Characterization of Google Glass, Rice University, Houston, Texas, UNSW, Australia, Jun. 25-26, 2014, 7 pages.
Christian Lander et al., GazeProjector: Accurate Gaze Estimation and Seamless Gaze Interaction Across Multiple Displays, DFKI GmbH, Saarbrücken, Germany, Departement of Computer Science, University of Copenhagen, Denmark, Max Planck Institute for Informatics, Saarbrücken, Germany, Nov. 8-11, 2015, 10 pages.
Michelle Fitzsimmons, Hands on: Microsoft HoloLens review, TechRadar, Sep. 15, 2016, 11 pages.

* cited by examiner

CONTROLLING DISPLAY OF CONTENT USING AN EXTERNAL DISPLAY DEVICE

CROSS REFERENCE TO RELATED APPLICATIONS

This application is a continuation of U.S. patent application Ser. No. 17/087,772 filed on Nov. 3, 2020, which itself is a continuation of U.S. patent application Ser. No. 16/344,879 filed on Apr. 25, 2019 (now U.S. Pat. No. 10,877,713), which itself is a 35 U.S.C. § 371 national stage application of PCT International Application No. PCT/EP2016/076425 filed on Nov. 2, 2016, the disclosures and contents of which are incorporated by reference herein in their entireties.

TECHNICAL FIELD

The invention relates to a method, wearable devices, a computer program and a computer program product for controlling display of content using an external display device.

BACKGROUND

Augmented reality (AR) is foreseen to become an integral technology in the networked society and potently disrupt the consumer electronics market. AR is here used to denote the concept of presenting a combination of real-world objects and computer-rendered content to a user. Specifically, one implementation of AR implies layering information such as text, images or videos on top of reality, on a user's view of the world via a see-through Head Mounted Display (HMD). One application of AR is to allow users to see and interact remotely and in 3D (three dimension), as if each participant share the same physical space. Hence, remote communication and interaction could become as natural as face-to-face communication.

A popular example of AR is the 2016 phenomenon of Pokemon Go, which has truly put forward the advantages of AR in the way people interact with each other and with video games.

In 2016, Microsoft launched Hololens, a mobile AR HMD. Several other HMDs are being launched by other companies including Meta and Magic Leap, which are set to improve the AR technology even further.

However, the Hololens battery lifetime ranges between 2.5 hours and 5.5 hours, depending on load. In order for an HMD to replace a smartphone, its battery life has to be extended.

SUMMARY

It is an object to improve power efficiency for a wearable device allowing a user to see both real-world objects and computer-rendered content.

According to a first aspect, it is presented a method for controlling display of content, the method being performed in a wearable device, the wearable device comprising a head mounted display allowing a user to see both real-world objects and computer-rendered content. The method comprises the steps of: selecting an external display device in a vicinity of the wearable device; determining first visual content to be suitable for being displayed on the external display device; and sending a request for the external display device to display the first visual content and refraining from displaying the first visual content using the head mounted display.

The first visual content may comprise streaming video.

The first visual content may comprise computer graphics.

The step of sending the request may comprise requesting the external display device to both render the first visual content and display the first visual content.

The step of sending the request may comprise sending the request to a content server, requesting the content server to transmit the first visual content to the external display device.

The step of determining the first visual content may comprise determining that there is no privacy setting associated with the first visual content preventing display of the first visual content on the external display device.

The step of determining first visual content may comprise determining first visual content being two-dimensional visual content, and determining three-dimensional visual content to be second visual content which is unsuitable for being displayed on the external display device.

The method may further comprise the step of: displaying the second visual content using the head mounted display.

The method may further comprise the step of: obtaining a current battery level of the wearable device. In such a case, the step of determining first visual content comprises easier considering visual content to be suitable for being displayed on the external display device when the battery level is lower.

The method may further comprise the step of: adapting the first visual content for being displayed on the external display device.

The step of selecting an external display device may comprise determining that a direction of movement of the wearable device is towards the external display device.

The step of selecting an external display device may comprise selecting one of a plurality of external display devices based on a battery level of at least one of the plurality of external display devices.

The step of selecting an external display device may comprise selecting one of a plurality of external display devices based on energy consumption of each one of the plurality of external display devices.

According to a second aspect, it is presented a wearable device for controlling display of content. The wearable device comprises: a head mounted display allowing a user to see both real-world objects and computer-rendered content; a processor; and a memory. The memory stores instructions that, when executed by the processor, cause the wearable device to: select an external display device in a vicinity of the wearable device; determine first visual content to be suitable for being displayed on the external display device; and send a request for the external display device to display the first visual content and refraining from displaying the first visual content using the head mounted display.

The first visual content may comprise streaming video.

The first visual content may comprise computer graphics.

The instructions to send the request may comprise instructions that, when executed by the processor, cause the wearable device to requesting the external display device to both render the first visual content and display the first visual content.

The instructions to send the request may comprise instructions that, when executed by the processor, cause the wearable device to send the request to a content server, requesting the content server to transmit the first visual content to the external display device.

The instructions to determine the first visual content may comprise instructions that, when executed by the processor, cause the wearable device to determine that there is no privacy setting associated with the first visual content preventing display of the first visual content on the external display device.

The instructions to determine first visual content may comprise instructions that, when executed by the processor, cause the wearable device to, determine first visual content being two-dimensional visual content, and determine three-dimensional visual content to be second visual content which is unsuitable for being displayed on the external display device.

The wearable device may further comprise instructions that, when executed by the processor, cause the wearable device to display the second visual content using the head mounted display.

The wearable device may further comprise instructions that, when executed by the processor, cause the wearable device to obtain a current battery level of the wearable device. In such a case, the instructions to determine first visual content comprise instructions that, when executed by the processor, cause the wearable device to easier consider visual content to be suitable for being displayed on the external display device when the battery level is lower.

The wearable device may further comprise instructions that, when executed by the processor, cause the wearable device to adapt the first visual content for being displayed on the external display device.

The instructions to select an external display device may comprise instructions that, when executed by the processor, cause the wearable device to determine that a direction of movement of the wearable device is towards the external display device.

The instructions to select an external display device may comprise instructions that, when executed by the processor, cause the wearable device to select one of a plurality of external display devices based on a battery level of at least one of the plurality of external display devices.

The instructions to select an external display device may comprise instructions that, when executed by the processor, cause the wearable device to select one of a plurality of external display devices based on energy consumption of each one of the plurality of external display devices.

According to a third aspect, it is presented a wearable device comprising: means for selecting an external display device in a vicinity of the wearable device, the wearable device comprising a head mounted display allowing a user to see both real-world objects and computer-rendered content; means for determining first visual content to be suitable for being displayed on the external display device; and means for sending a request for the external display device to display the first visual content and refraining from displaying the first visual content using the head mounted display.

According to a fourth aspect, it is presented a computer program for controlling display of content, using a wearable device comprising a head mounted display allowing a user to see both real-world objects and computer-rendered content. The computer program comprises computer program code which, when run on the wearable device causes the wearable device to: select an external display device in a vicinity of the wearable device; determine first visual content to be suitable for being displayed on the external display device; and send a request for the external display device to display the first visual content and refraining from displaying the first visual content using the head mounted display.

According to a fifth aspect, it is presented a computer program product comprising a computer program according to the fourth aspect, and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
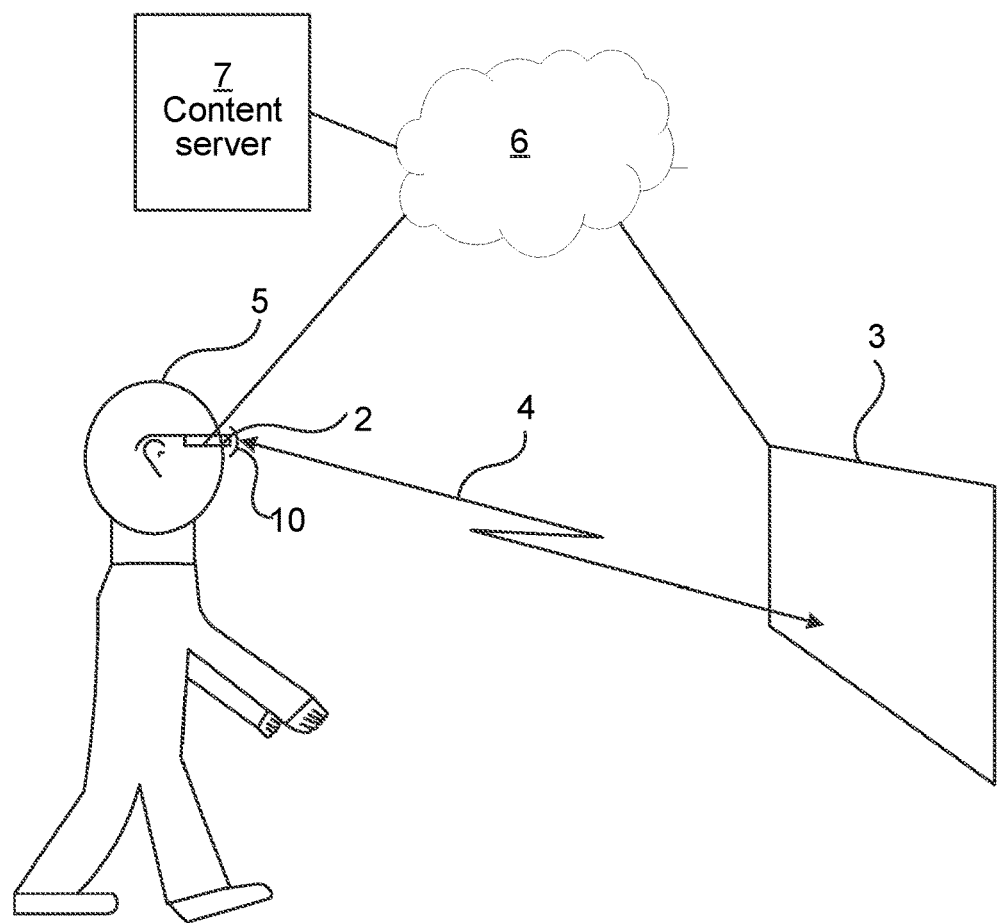
FIG. 1 is a schematic diagram illustrating an environment where embodiments presented herein can be applied.

FIG. 1 is a schematic diagram illustrating an environment where embodiments presented herein can be applied. A user 5 wears a wearable device 2. The wearable device comprises a head mounted display (HMD) 10, which allows the user 5 to see both real-world objects and computer-rendered content. Real-world objects are physical objects which are not computer-rendered, i.e. not virtual. For instance, the HMD 10 can be implemented using a Microsoft Hololens. It is to be noted that the term 'computer' used herein is to be interpreted as any electronic device with digital processing capabilities, regardless of size. Hence, the term computer comprises devices such as servers, desktop computers, laptop computers, tablet computers, smart phones, mobile phones, smart watches, etc.

Since the user 5 can experience a combination of real-world objects and computer-rendered content, the wearable device 2 allows for a plethora of applications in the field often referred to augmented reality (AR).

According to embodiments presented herein, at least part of content originally intended for display using the HMD 10 can be offloaded from the wearable device 2 to an external display device 3. It is to be noted that the term external implies that the external display device 3 is external in relation to the wearable device 2. The external display device 3 is any type of device comprising a display which can be used to show computer-rendered content. For instance, the external display device 3 can be any of a television, a computer screen, a smart phone, a smart watch, a tablet computer, a projector, etc. While only one external display device 3 is shown in FIG. 1, any number of external display devices can be provided in the vicinity of the user 5.

Each one of the wearable device 2 and the external display device 3 is connected to a network 6. The network can e.g. be a local area network (LAN) and/or a wide area network (WAN) such as the Internet. A content server 7 is also connected to the network 6. The content server 7 provides content for rendering at the wearable device 2 and/or the external display device 3.

Moreover, there is a communication link 4 between the wearable device 2 and the external device 3. The communication link 4 between the wearable device 2 and the external device 3 can be implemented as a point-to-point communication link or the communication link 4 can be implemented via the network 6.

According to embodiments presented herein, the wearable device 2 can offload at least part of content, originally intended for display using the HMD 10, from the wearable device 2 to an external display device 3. This can save a significant amount of power in the wearable device 2, thus prolonging battery life in the wearable device 2.

Figure 2:
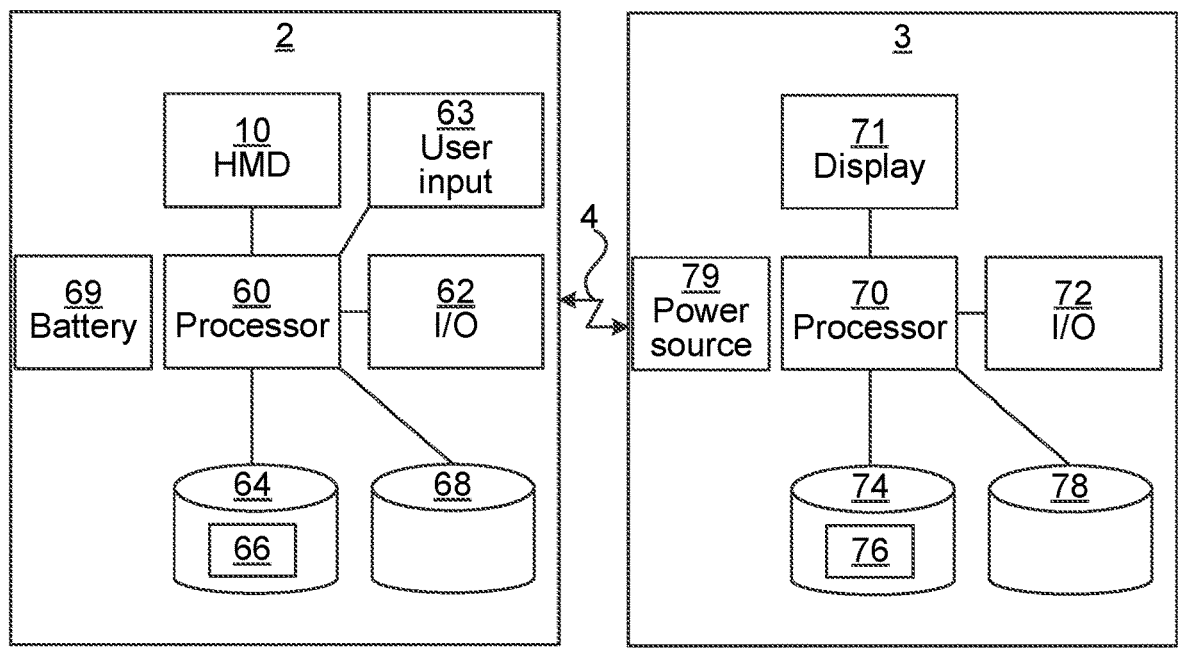
FIG. 2 is a schematic diagram illustrating components of the wearable device and the external display device of FIG. 1.

FIG. 2 is a schematic diagram illustrating components of the wearable device 2 and the external display device 3 of FIG. 1.

First, the wearable device 2 will be described. A processor 60 is provided using any combination of one or more of a suitable central processing unit (CPU), multiprocessor, microcontroller, digital signal processor (DSP), application specific integrated circuit etc., capable of executing software instructions 67 stored in a memory 64, which can thus be a computer program product. The processor 6o can be configured to execute the method described with reference to FIGS. 5A-B below.

The memory 64 can be any combination of read and write memory (RAM) and read only memory (ROM). The memory 64 also comprises persistent storage, which, for example, can be any single one or combination of magnetic memory, optical memory, solid state memory or even remotely mounted memory.

A data memory 68 is also provided for reading and/or storing data during execution of software instructions in the processor 60. The data memory 68 can be any combination of read and write memory (RAM) and read only memory (ROM).

The wearable device 2 further comprises an I/O interface 62 for communicating with external entities such as with the external display device 3 over the communication link 4. For instance, the I/O interface 62 can be used for communication using any suitable wireless communication protocol, e.g. any one or more of Bluetooth, any one of the IEEE 802.11x standards (also known as WiFi), Bluetooth Low Energy (BLE), ZigBee, etc.

A head mounted display (HMD) 10 is a display which, when in operation, allows the user to see both real-world objects and computer-rendered content.

Computer-rendered content is here content which is rendered by the wearable device 2. The HMD 10 can e.g. be implemented as eyeglasses with a display, which can be transparent when no content is displayed on the display.

The wearable device 2 also comprises a user input device 63 allowing the wearable device 2 to accept input from the user 5. For instance, the user input device 63 can comprise any one of more of a microphone (for voice control), a push button, eye tracking, etc.

The wearable device 2 is portable and thus comprises a battery 69 for power. The battery 69 can be a rechargeable battery and/or a single use, replaceable, battery 69.

Other components of the wearable device 2 are omitted in order not to obscure the concepts presented herein.

Now, the external display device 3 will be described. A processor 70 is provided using any combination of one or more of a suitable central processing unit (CPU), multiprocessor, microcontroller, digital signal processor (DSP), application specific integrated circuit etc., capable of executing software instructions 76 stored in a memory 74, which can thus be a computer program product.

The memory 74 can be any combination of read and write memory (RAM) and read only memory (ROM). The memory 74 also comprises persistent storage, which, for example, can be any single one or combination of magnetic memory, optical memory, solid state memory or even remotely mounted memory.

A data memory 78 is also provided for reading and/or storing data during execution of software instructions in the processor 70. The data memory 78 can be any combination of read and write memory (RAM) and read only memory (ROM).

The external display device 3 further comprises an I/O interface 72 for communicating with external entities such as with the wearable device 2 (over the communication link 4) and the network 6. For instance, the I/O interface 72 can be used for communication using any suitable communication protocol, e.g. any one or more of Ethernet, Bluetooth, any one of the IEEE 802.11x standards (also known as WiFi), Bluetooth Low Energy (BLE), ZigBee, etc.

A display 71 is a display which can display computer-rendered content, e.g. rendered by the external display device 3.

A power source 79 is used for powering the external display device 3. The power source can e.g. be a mains connection and/or a battery. When present, the battery 79 can be a rechargeable battery and/or a single use, replaceable, battery 79.

Other components of the external display device 3 are omitted in order not to obscure the concepts presented herein.

Figure 3:
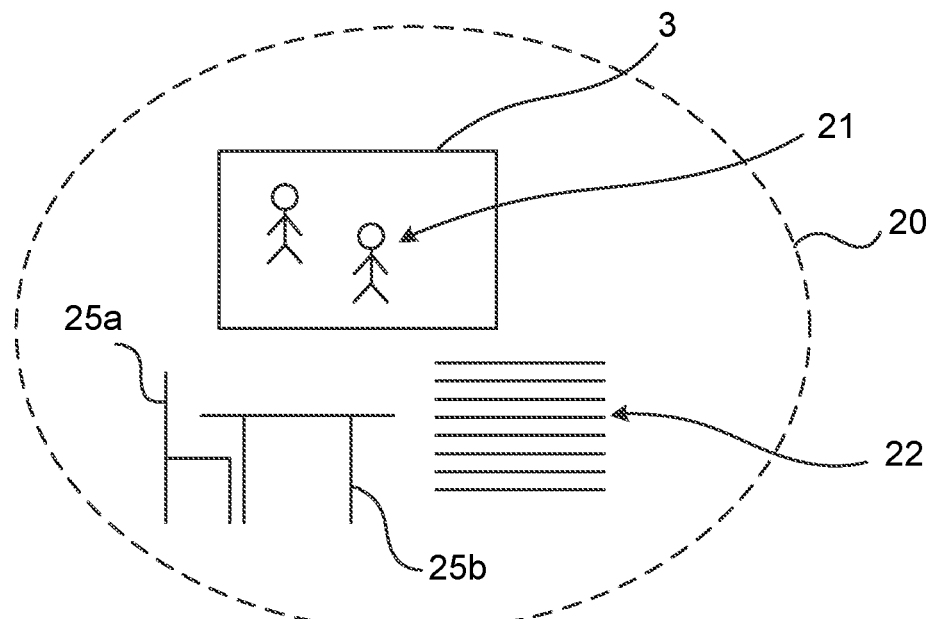
FIG. 3 is a schematic drawing illustrating a field of view of a user using the wearable device of FIG. 1.

FIG. 3 is a schematic drawing illustrating a field of view 20 of a user using the wearable device 2 of FIG. 1.

The field of view 20 limits the viewing experience of the user, at least for computer-rendered content. Within the field of view 20, the user can see both real-world objects, such as a chair 25a and a table 25b. Moreover, the user can see computer-rendered content 22 within the field of view 20. The computer-rendered content 22 can be any combination of text, images, video and computer generated graphics.

There is also an external display device 3, in this example a television, within the field of view 21. In this example, the wearable device 2 has determined to offload the display of content, in the form of a video clip, to the external display device 3. In this way, the user can still view the video clip, but it is the external display device 3 and not the wearable device 2 that displays the video clip, thus saving power use in the wearable device 2.

Figure 4:
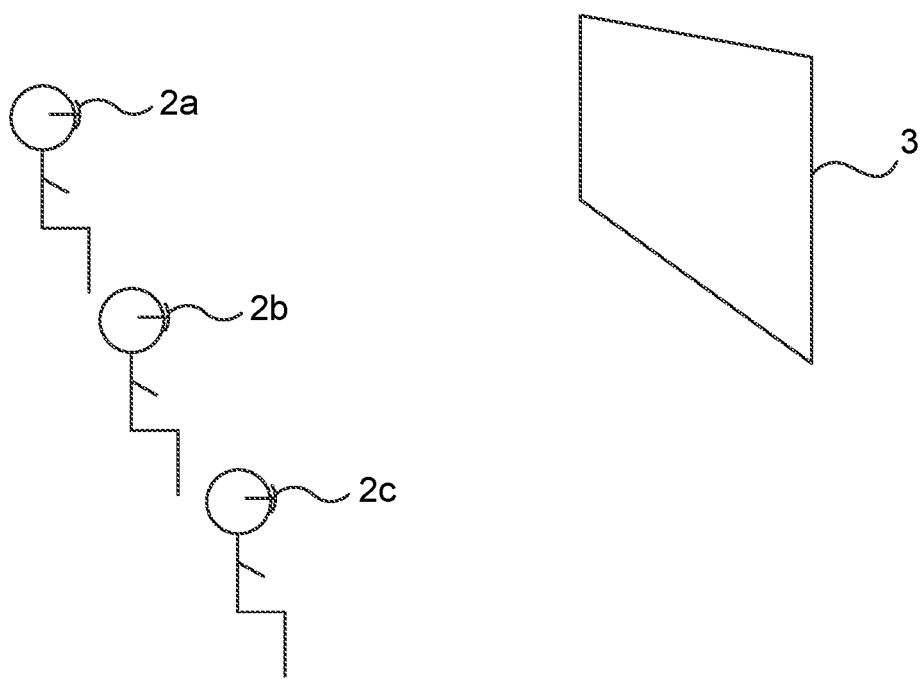
FIG. 4 is a schematic drawing illustrating three users, where each user has his/her own wearable device.

FIG. 4 is a schematic drawing illustrating three users 5a-c, where each user 5a-c has his/her own wearable device 2a-c. An external display device 3 is within view of all three wearable devices 2a-c.

In this situation, if all three users 5a-c e.g. are watching a live sports event on their respective wearable devices 2a-c, the display of the sports event can be offloaded from all three wearable devices 2a-c to the external display device 3. In total, this saves even more power since only one device is used for the display of the sports event instead of three.

It is to be noted, however, that there may still be content which is displayed using the respective wearable displays 2a-c due to privacy settings. For instance, if the second user 5b receives a text message, this is content which can be configured to be displayed using the wearable device 2b, and will not be offloaded to the external display device 3. In this way, only the second user 5b can read the text message. Also, if there is user specific content (or content that one user has signed up for, in e.g. the sports event to receive statistics of certain team or players), this could be done for each one individually, but the main content could be shown on the external display device for all users to see.

Figure 5A:
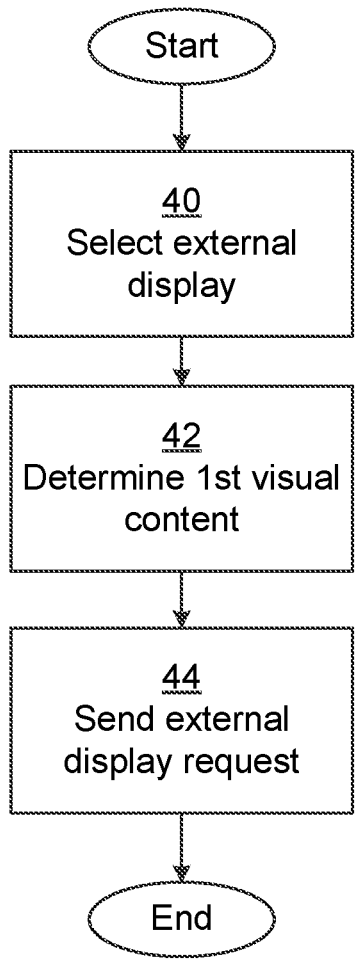
FIGS. 5A-B are flow charts illustrating embodiments of methods performed in the wearable device for controlling display of content.
Figure 5B:
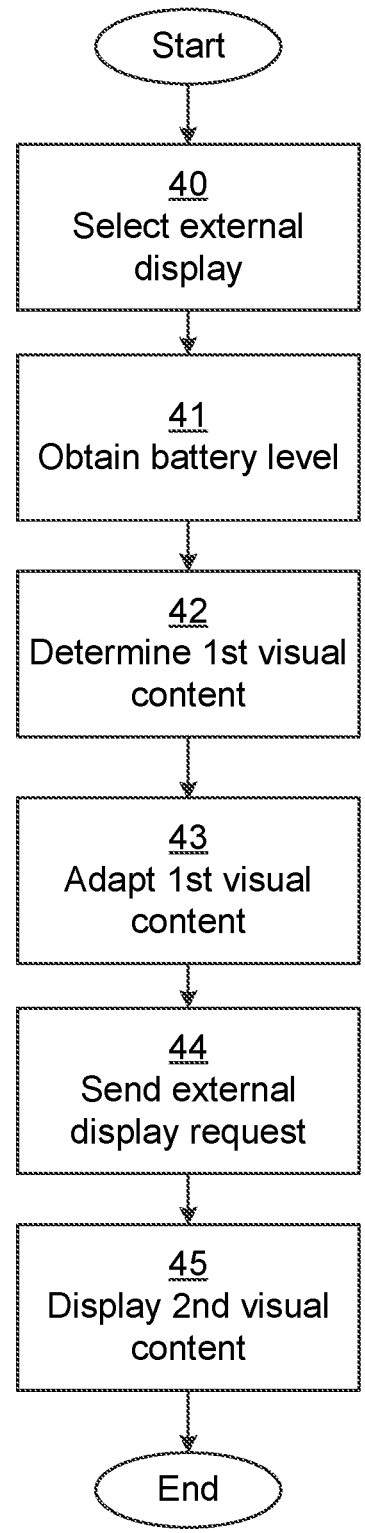

FIGS. 5A-B are flow charts illustrating embodiments of methods performed in the wearable device for controlling display of content. As explained above, the wearable device comprises a head mounted display allowing a user to see both real-world objects and computer-rendered content. First, embodiment of methods illustrated by FIG. 5A will be described.

In a select external display step 40, an external display device in a vicinity of the wearable device is selected.

In one embodiment, this comprises determining that a direction of movement of the wearable device is towards the external display device which is selected. Optionally, the selection of external display device is also based on the orientation of the head and/or eyes of the user.

In one embodiment, this comprises selecting one of a plurality of external display devices based on a battery level of at least one of the plurality of external display devices. For instance, there may be two potential external devices: a tablet computer and a laptop computer within view of the user. The selection between these two external devices can then be based on their respective battery levels, such that the external device with the most amount of battery is selected to the be external device for display of content.

In one embodiment, this comprises selecting one of a plurality of external display devices based on energy consumption of each one of the plurality of external display devices. In other words, the external device which consumes the least amount of energy, regardless of power source, can be selected to reduce total power consumption for consuming the content.

In one embodiment, a predicted battery level of the wearable device is considered when selecting the external display device. The predicted battery level can e.g. be based a current set of applications executing in the wearable device, and/or a current total energy usage rate in the wearable device.

In a determine $1^{st}$ visual content step 42, first visual content is determined to be suitable for being displayed on the external display device. The first visual content can comprise streaming video and/or computer graphics.

In one embodiment, this comprises determining that there is no privacy setting associated with the first visual content preventing display of the first visual content on the external display device. For instance, as illustrated above, personal messages (such as text messages or e-mail messages) can be prevented from being displayed externally.

In one embodiment, this comprises determining first visual content being two-dimensional visual content, while three-dimensional visual content is determined to be a second visual content which is unsuitable for being displayed on the external display device. In many situations, it is only the HMD which is capable of displaying three-dimensional content.

Optionally, the wearable device considers the energy spent on the communication required to offload the first visual content. It may be that if the visual content is very dynamic and heavy in size, and the visual content has to be sent from the wearable device to the external device more or less constantly.

The wearable device can then decide that such content is not to form part of the first visual content (to be offloaded) since the constant communication ends up using more battery power than just displaying the visual using the HMD. In a send external display request step 44, a request is sent for the external display device to display the first visual content. The wearable device then refrains from displaying the first visual content using the head mounted display.

In one embodiment, this comprises requesting the external display device to both render the first visual content and display the first visual content. Alternatively, the wearable device renders the first visual content but the external display device displays the first visual content.

In one embodiment, this comprises sending the request to a server, requesting the server to transmit the first visual content to the external display device. In such an embodiment, the wearable device is completely offloaded in handling the first visual content, reducing power usage even more in the wearable device.

Looking now to FIG. 5B, only new or modified steps, compared to what is described with reference to FIG. 5A above, is now described.

In an obtain battery level step 41, a current battery level of the wearable device is obtained. When the battery level is available, the determine visual content step 42 comprises easier considering visual content to be suitable for being displayed on the external display device when the battery level is lower. In other words, the offloading is more aggressive when the battery level in the wearable device is low. Easier here implies a lower threshold to offload. Such a threshold can e.g. be based on a distance to an external display device, a minimum size of an external display device, an angular distance of the external display device from a centre viewing angle of the user etc.

In an adapt $1^{st}$ visual content step 43, the first visual content is adapted for being displayed on the external display device. For instance, if the external display device is a smart watch, a video clip may need to be adapted in resolution and/or in frame rate.

In a display $2^{nd}$ visual content step 45, the second visual content is displayed using the head mounted display. Using the example of FIG. 4 explained above, this can e.g. be the display of the second visual content being a text message.

An example of applying an embodiment of the described method is of a user watching a video using an HMD, where the video is (virtually) being displayed on a wall. At the same time an external display device in the form of a projector is available in the same room which projects content in one of the room walls (not necessarily the same wall where the HMD is currently displaying the video). In order to save energy, the HMD stops displaying the video and the video display is performed by the projector instead.

However, if the user requires to visualize a 3D object at a certain moment, that object can be displayed in the HMD while the additional 2D video is still displayed by the projector on the wall.

In the above example, the rendering may be performed locally at each external display device based on the video which is to be displayed at each of the devices. In another example, if certain components of the video are static throughout the visualisation, the rendering may be performed by the wearable device and the projector only performs the display. In this way, the rendering is performed at a low frequency (potentially even only once, if the content does not change through the presentation), effectively reducing the processing power required for rendering.

In another example, the user has an external display device in the form of a digital screen (e.g. tablet computer) within line of sight and is wearing an HMD. The HMD may then offload all 2D rendering and display components to the digital screen while keeping the 3D rendering and display to be displayed using the HMD. As in the above example, static 2D or 3D content components may be rendered at the HMD (e.g. text) and transmitted to the external display device.

In another embodiment, the wearable device is able to detect the direction of motion of the wearable device and thus predicts which external display devices will be in line of sight with the user. In this way, the wearable device may schedule the transmission of future content for display on the external display device, while displaying directional information in the HMD, informing the user of such future action (e.g. an arrow pointing to the external display device which will be performing the display of the information and at what time).

In another embodiment, the external display devices inform the wearable device of its capabilities (e.g. rendering and display characteristics, battery level) and location in order for the wearable device to consider this information when deciding what visual content to offload and whether and how to adapt the visual content for display on the external display device(s).

In another embodiment, due to the availability of a suitable external display device in a nearby room, the wearable device may inform the user that the user could move to the nearby room in order to save battery. In this way, line of sight is not required for offloading visual content.

In another embodiment, the wearable device may detect that the available display has a screen size that is very small (e.g. smartwatch). However, due to low battery levels, the visual content is still displayed on the smart watch, albeit with the visual content being adapted for the small display.

In a related embodiment, the external devices may be displaying content where such content may have components in common with the content that is to be displayed by the HMD (content B and content A are correlated). In that way, the HMD does not need to transmit the overlapping components of content A to the external device which saves bandwidth. For instance, if the wearable device shows a video stream from a live sports event which is also displayed on a television within view of the user, the wearable display can simply refrain from displaying the live sports event.

In another embodiment, the external display device may have both rendering and display capabilities, while in others the external display device may have only display capabilities for the visual content in question.

Figure 6:
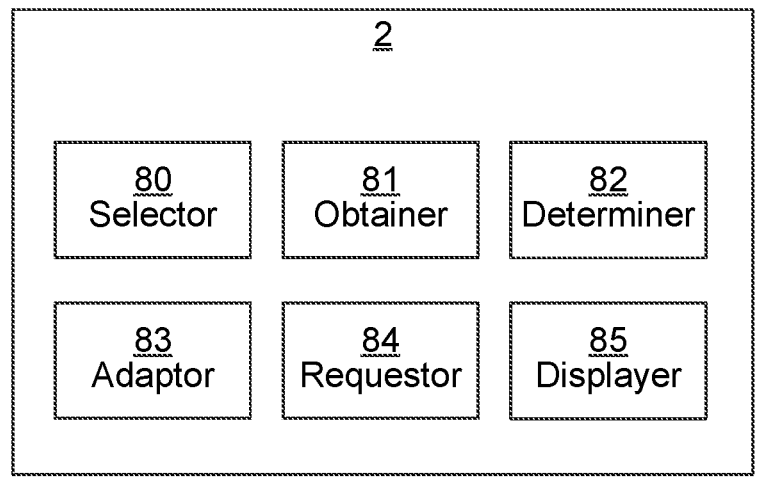
FIG. 6 is a schematic diagram showing functional modules of the wireless device of FIG. 2 according to one embodiment.

FIG. 6 is a schematic diagram showing functional modules of the wireless device 2 of FIG. 2 according to one embodiment. The modules are implemented using software instructions such as a computer program executing in the wireless device. Alternatively or additionally, the modules are implemented using hardware, such as any one or more of an ASIC (Application Specific Integrated Circuit), an FPGA (Field Programmable Gate Array), or discrete logical circuits. The modules correspond to the steps in the methods illustrated in FIGS. 5A and 5B.

A selector 80 corresponds to step 40. An obtainer corresponds to step 41. A determiner 82 corresponds to step 42. An adaptor 83 corresponds to step 43. A requestor 84 corresponds to step 44. A displayer 85 corresponds to step 45.

Figure 7:
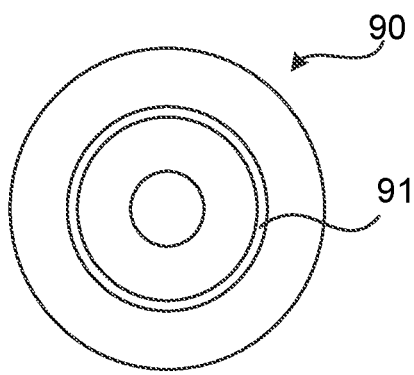
FIG. 7 shows one example of a computer program product comprising computer readable means.

FIG. 7 shows one example of a computer program product comprising computer readable means. On this computer readable means a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 67 of FIG. 2. While the computer program 91 is here schematically shown as a track on the depicted optical disk, the computer program can be stored in any way which is suitable for the computer program product, such as a removable solid state memory, e.g. a Universal Serial Bus (USB) drive.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method performed by a wearable device to control display of content, the wearable device comprising a head mounted display, the method comprising:
   receiving from a plurality of external display devices via a wireless communication interface a message containing information indicating at least one of (i) a battery level of at least one external display device of the plurality of external display devices and (ii) an energy consumption of at least one external display device of the plurality of external display devices;
   selecting an external display device of the plurality of external display devices based on the at least one of (i) the battery level of at least one external display device of the plurality of external display devices and (ii) the energy consumption of at least one external display device of the plurality of external display devices;
   determining first visual content to be suitable for being displayed on the external display device; and
   sending through the wireless communication interface a request for the external display device to display the first visual content; and
   refraining from displaying the first visual content using the head mounted display.

2. The method of claim 1, wherein the head mounted display allows a user to see both real-world objects and computer-rendered content,
   wherein the external display device is physically separate from and communicatively connected to the wearable device, and
   wherein selecting the external display device comprises selecting the external display device based on at least one of:
   a battery level of each external display device of the plurality of external display devices; and an energy consumption of each external display device of the plurality of external display devices.

3. The method of claim 1, wherein the first visual content comprises at least one of:
streaming video; and
computer graphics.

4. The method of claim 1, wherein sending the request comprises requesting the external display device to both render the first visual content and display the first visual content.

5. The method of claim 1, wherein sending the request comprises sending the request to a content server, the request requesting the content server to transmit the first visual content to the external display device.

6. The method of claim 1, wherein determining the first visual content comprises determining that there is no privacy setting associated with the first visual content preventing display of the first visual content on the external display device.

7. The method of claim 1, wherein determining the first visual content comprises:
determining first visual content being two-dimensional visual content; and
determining three-dimensional visual content to be second visual content that is unsuitable for being displayed on the external display device.

8. The method of claim 7, further comprising:
displaying the second visual content using the head mounted display.

9. The method of claim 1, further comprising:
obtaining a current battery level of the wearable device,
wherein determining the first visual content comprises determining the first visual content to be suitable for being displayed on the external display device based on the current battery level of the wearable device.

10. The method of claim 1, further comprising:
adapting the first visual content for being displayed on the external display device.

11. A wearable device for controlling display of content, the wearable device comprising:
a head mounted display;
a processor coupled to the head mounted display; and
a memory coupled to the processor and having instructions stored therein that are executable by the processor to cause the wearable device to perform operations, the operations comprising:
receiving from a plurality of external display devices via a wireless communication interface a message containing information indicating at least one of (i) a battery level of at least one external display device of the plurality of external display devices and (ii) an energy consumption of at least one external display device of the plurality of external display devices;
selecting an external display device of the plurality of external display devices based on the at least one of (i) the battery level of at least one external display device of the plurality of external display devices and (ii) the energy consumption of at least one external display device of the plurality of external display devices;
determining first visual content to be suitable for being displayed on the external display device; and
sending through the wireless communication interface a request for the external display device to display the first visual content; and
refraining from displaying the first visual content using the head mounted display.

12. The wearable device of claim 11, wherein the head mounted display allows a user to see both real-world objects and computer-rendered content,
wherein the external display device is physically separate from and communicatively connected to the wearable device, and
wherein selecting the external display device comprises selecting the external display device based on at least one of:
a battery level of each external display device of the plurality of external display devices; and
an energy consumption of each external display device of the plurality of external display devices.

13. The wearable device of claim 11, wherein the first visual content comprises at least one of:
streaming video; and
computer graphics.

14. The wearable device of claim 11, wherein sending the request comprises requesting the external display device to both render the first visual content and display the first visual content.

15. The wearable device of claim 11, wherein sending the request comprises sending the request to a content server, the request requesting the content server to transmit the first visual content to the external display device.

16. The wearable device of claim 11, wherein determining the first visual content comprises determining that there is no privacy setting associated with the first visual content preventing display of the first visual content on the external display device.

17. The wearable device of claim 11, wherein determining the first visual content comprises:
determining first visual content being two-dimensional visual content; and
determining three-dimensional visual content to be second visual content that is unsuitable for being displayed on the external display device.

18. The wearable device of claim 17, the operations further comprising:
displaying the second visual content using the head mounted display.

19. The wearable device of claim 11, the operations further comprising:
obtaining a current battery level of the wearable device,
wherein determining the first visual content comprises determining the first visual content to be suitable for being displayed on the external display device based on the current battery level of the wearable device.

20. The wearable device of claim 11, the operations further comprising:
adapting the first visual content for being displayed on the external display device.

* * * * *